W. C. MARSH.
VALVE.
APPLICATION FILED JULY 8, 1914.
1,151,494.
Patented Aug. 24, 1915.
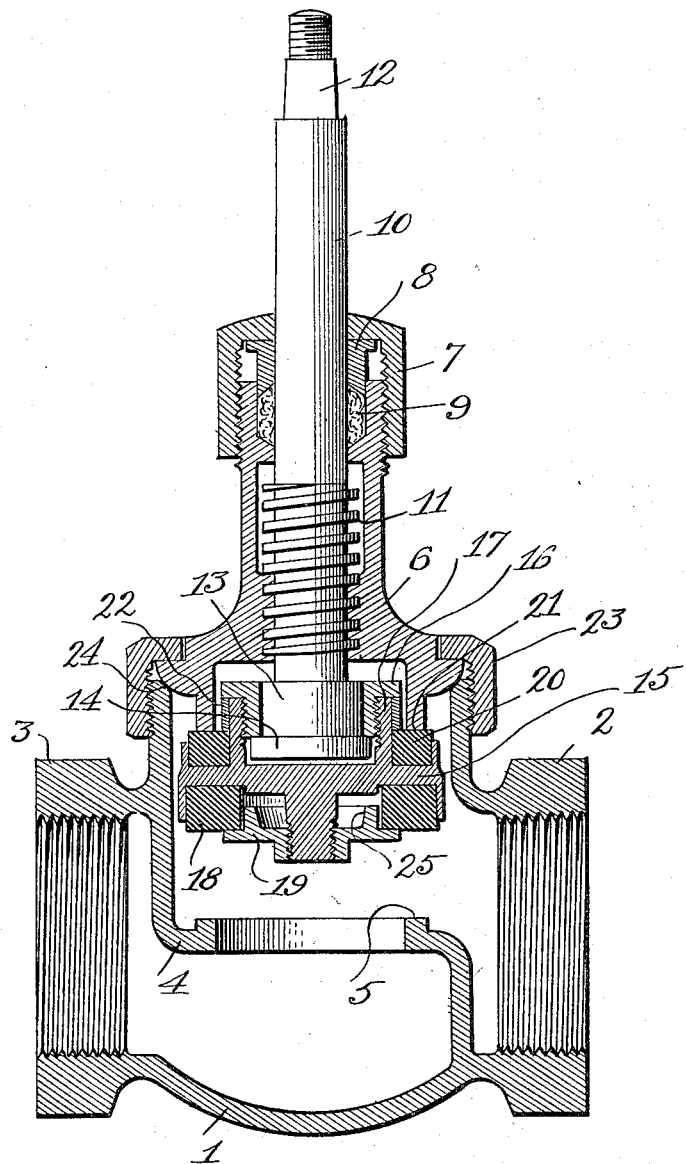
Witnesses
Edwin L. Yewell
Sallie Boland
Inventor
William C. Marsh
By Percy B. Hills
Attorney

UNITED STATES PATENT OFFICE.

WILLIAM C. MARSH, OF DUNKIRK, NEW YORK, ASSIGNOR TO MARSH VALVE COMPANY, OF DUNKIRK, NEW YORK, A CORPORATION OF NEW YORK.

VALVE.

1,151,494.

Specification of Letters Patent.

Patented Aug. 24, 1915.

Application filed July 8, 1914. Serial No. 849,750.

*To all whom it may concern:*

Be it known that I, WILLIAM C. MARSH, a citizen of the United States, residing at Dunkirk, in the county of Chautauqua and State of New York, have invented certain new and useful Improvements in Valves, of which the following is a specification.

My invention relates to valves, more particularly of that type disclosed in Letters Patent, No. 1,009,763, granted to me Nov. 28, 1911, and has for its object to provide certain improvements in the construction of the same, as will be hereinafter more definitely pointed out and claimed, reference being had to the accompanying drawing, in which the figure is a central vertical sectional view of my improved valve.

In the said drawing, the reference numeral 1 denotes the casing or body of a valve, having suitably interiorly threaded inlet and outlet apertures 2, 3, and an integral partition 4 forming a valve seat 5. The upper portion of the body 1 is apertured to receive a bonnet piece 6, retained as hereinafter described, said bonnet piece in turn carrying a packing nut 7 at its upper end, adapted to act on a follower 8 to compress a packing 9.

Passing centrally through the packing nut 7, follower 8, packing 9 and the bonnet piece 6 is a valve stem 10, provided intermediate its length with a screw-thread 11 in threaded engagement with the bonnet piece 6, so that the stem 10 will move up and down in said bonnet piece when rotated by a suitable handle (not shown) applied to the upper squared end 12 thereof. Below said screw-thread 11, the stem 10 is enlarged at 13 and at its lower end is formed into an integral collar 14 over which fits a disk holder 15, which is retained in position by an elongated apertured flanged nut 16, loosely surrounding the enlarged portion 13 of the stem 10, said nut 16 being screwed into the elongated upper end 17 of said disk holder 15 with a screw-thread the opposite of screw-thread 11. The lower surface of said disk holder 15 is recessed annularly to receive a suitable hard packing disk 18, which is retained in position by a washer 19, said packing disk being adapted to engage the valve seat 5 in the partition 4 when said valve disk holder is in its lowermost position. The upper surface of said disk holder 15 is provided with an annular recess adapted to receive a suitable hard packing disk 20, which when said disk holder is in its uppermost position, contacts with an annular seat 21 formed in the bonnet piece 6, said packing disk being retained in position by an elongated sleeve 22 bearing thereon and being retained in position by the flange of the nut 16. The bonnet piece 6 is detachably retained in position on the body 1 by means of a collar 23 in screw-threaded engagement with said body 1, the flange of said collar engaging a suitably recessed portion of said bonnet piece, and that portion 24 of said bonnet piece which contacts with the body 1 being curved to provide an adjustable seat for said bonnet piece.

In operation a rotation to the right of the stem 10 will, through thread 11, cause a bodily downward movement of the stem 10 and disk holder 15 until the packing disk 18 contacts with the valve seat 5, thus closing the valve. In opening, the movement of the stem 10 is reversed, and as the valve is opened the packing disk 20 comes in contact with its seat 21, thus preventing the escape of fluid through the bonnet piece 6, it being observed that the disk holder 15 is solid and provides no means for the escape of fluid therethrough to the stem 10.

To assemble the parts the disk holder 15 is first positioned with respect to the stem 10, and said parts are then inserted into the bonnet piece from below and these assembled parts are then positioned on the body 1 by means of screw threaded collar 23.

It will be observed that the nut 16 has an elongated screw-threaded portion for engaging the upper elongated end 17 of the disk holder 15, thus providing a comparatively long area of screw-thread contact, which has been found necessary in order properly to resist the thrust on the disk holder when the upper valve seat 21 is contacted with. And in order to provide for retaining the packing disk 20 in position, and at the same time to provide this long contact surface, the interposition of the sleeve 22 to engage said packing disk 20 has been found essential. A slight play is permitted between the nut 16 and the enlarged portion 13 of the valve stem, as well as a slight play between the collar 14 and the interior of the disk holder 15, which play permits the packing disks 18 and 20 to seat firmly upon their seats 5 and 21 when screwed to position. And by elongating the upper end of the disk holder 15 and employing the sleeve 22, I am able to dispose the packing ring 20 substantially on a line with the collar 14, whereby the accurate seating of the packing 20 against its seat 21 by any necessary slight rocking of the disk holder 15 is more readily accomplished.

By providing the curved contact surface 24 on the bonnet piece 6, I provide for an adjustable seating of said bonnet piece and its parts in the casing 1, which may be accomplished by first loosely screwing the bonnet piece 6 to position, then seating the lower ring 18 firmly on its seat 5, which accurately will adjust the disk holder 15 to position, and finally tightly securing the collar 23 to position.

It will be observed that the nut 19 is formed with an annular flange 25 on its upper surface, which flange forms an inner wall to prevent the expansion of the packing disk 18 inwardly. By so forming the nut 19, the disk holder 15 may be made lighter without affecting its function, as otherwise the body of said disk holder would have to be projected downward to form an inner wall for the packing disk 18.

Having thus described my invention, what I claim as new and desire to secure by Letters Patent, is:—

1. A valve embodying a casing, a longitudinally movable valve stem therein having a collar on its lower end, oppositely disposed seats in said casing, an integral disk holder in said casing embracing said collar and carrying oppositely disposed disks for engaging said seats, a flanged nut surrounding said stem and in screw-threaded engagement with said disk holder and bearing against said collar, and a sleeve disposed between the flange on said nut and adjacent disk to retain the latter in position.

2. A valve embodying a casing, a longitudinally movable valve stem therein having an integral collar formed on its lower end, oppositely disposed seats in said casing, an integral disk holder in said casing embracing said collar and carrying oppositely disposed disks for engaging said seats, a flanged nut surrounding said stem and in screw-threaded engagement with said disk holder and bearing against said collar, and a sleeve disposed between the flange on said nut and adjacent disk to retain the latter in position.

3. A valve embodying a casing, a longitudinally movable valve stem therein having an integral collar formed on its lower end, oppositely disposed seats in said casing, an integral disk holder in said casing formed with an elongated interiorly screw-threaded upper end and carrying oppositely disposed disks for engaging said seats and embracing said collar, a flanged nut surrounding said stem and in screw-threaded engagement with the elongated upper end of said disk holder and bearing against said collar, and a sleeve disposed between the flange on said nut and adjacent disk to retain the latter in position.

In testimony whereof I affix my signature in the presence of two subscribing witnesses.

WILLIAM C. MARSH.

Witnesses:
N. F. GOULD,
V. R. MARSH.

Copies of this patent may be obtained for five cents each, by addressing the "Commissioner of Patents, Washington, D. C."